US006711302B1

(12) United States Patent
Lee

(10) Patent No.: US 6,711,302 B1
(45) Date of Patent: Mar. 23, 2004

(54) METHOD AND SYSTEM FOR ALTERING DEFECTS IN DIGITAL IMAGE

(75) Inventor: Raymond S. Lee, Austin, TX (US)

(73) Assignee: Eastman Kodak Company, Rochester, NY (US)

( * ) Notice: Subject to any disclaimer, the term of this patent is extended or adjusted under 35 U.S.C. 154(b) by 720 days.

(21) Appl. No.: 09/675,416

(22) Filed: Sep. 29, 2000

Related U.S. Application Data

(60) Provisional application No. 60/160,500, filed on Oct. 20, 1999.

(51) Int. Cl.[7] .......................... G06K 9/40; G06K 9/00

(52) U.S. Cl. ...................... 382/275; 382/254; 382/274; 382/167; 382/162

(58) Field of Search ............................ 382/162, 165, 382/167, 141, 254, 260, 274, 275; 358/505, 515, 518, 530, 532, 537

(56) References Cited

U.S. PATENT DOCUMENTS

| | | | |
|---|---|---|---|
| 4,260,899 A | 4/1981 | Baker | 250/563 |
| 4,301,469 A | 11/1981 | Modeen et al. | 358/75 |
| 4,302,108 A | 11/1981 | Timson | 356/359 |
| 4,462,860 A | 7/1984 | Szmanda | 156/626 |
| 4,670,779 A | 6/1987 | Nagano | 358/75 |
| 4,677,465 A | 6/1987 | Alkofer | 358/80 |
| 4,680,638 A | 7/1987 | Childs | 358/214 |
| 4,700,229 A | 10/1987 | Herrmann et al. | 358/166 |
| 4,775,238 A | 10/1988 | Weber | 356/431 |
| 4,796,061 A | 1/1989 | Ikeda et al. | 355/73 |
| 4,845,551 A | 7/1989 | Matsumoto | 358/80 |
| 4,933,566 A | 6/1990 | Masaaki et al. | 250/563 |
| 4,937,720 A | 6/1990 | Kirchberg | 363/41 |
| 4,969,045 A | 11/1990 | Haruki et al. | 358/228 |
| 4,972,091 A | 11/1990 | Cielo et al. | 250/562 |
| 4,989,973 A | 2/1991 | Noso et al. | 356/239 |
| 4,994,918 A | 2/1991 | Lingemann | 358/214 |
| 5,003,379 A | 3/1991 | Moore, Jr. et al. | 358/54 |
| 5,010,401 A | 4/1991 | Murakami et al. | 358/136 |
| 5,047,968 A | 9/1991 | Carrington et al. | 364/574 |
| 5,058,982 A | 10/1991 | Katzir | 385/33 |
| 5,091,972 A | 2/1992 | Kwon et al. | 382/54 |
| 5,097,521 A | 3/1992 | Massmann | 382/54 |
| 5,149,960 A | 9/1992 | Dunne et al. | 250/226 |

(List continued on next page.)

FOREIGN PATENT DOCUMENTS

| | | | |
|---|---|---|---|
| DE | 28 21 868 A1 | 11/1979 | G01N/21/32 |
| DE | 196 36 867 C1 | 1/1998 | H04N/5/21 |
| EP | 1 547 811 | 6/1979 | H04N/3/36 |

(List continued on next page.)

OTHER PUBLICATIONS

*Digital ICE*™, Applied Science Fiction, Inc., http://www.asf.com/html/o_products/iceprod.html. Aug. 5, 1999, 1 pg.

*About Digital ICE™ Technology*, Applied Science Fiction, Inc., http://www.asf.com/html/o_products/icetech.html. Aug. 5, 1999, 2 pgs.

(List continued on next page.)

*Primary Examiner*—Andrew W. Johns
*Assistant Examiner*—Amir Alavi
(74) *Attorney, Agent, or Firm*—David A. Novais

(57) ABSTRACT

One aspect of the invention is a method for correcting a digital image representative of a tangible image. A first corrected intensity value for a first pixel of a first channel of the digital image is calculated using electronic circuitry in response to the intensity of a first defect pixel in a defect channel associated with the digital image. The original intensity value of the pixel is replaced with the first corrected intensity value. The intensity of the defect pixel is replaced with an intensity value signifying that the first pixel is reliable. A second corrected intensity value is then calculated for a second pixel of the first channel of the digital image in response to the intensity of the first pixel after replacement and the intensity of the first defect pixel after replacement.

26 Claims, 3 Drawing Sheets

SCAN IMAGE
CREATE DEFECT CHANNEL
90
CHOOSE PIXEL FOR CORRECTION
92
OPTIONALLY CONVERT RELEVANT PIXELS TO LOG SPACE
94
CORRECT PIXEL IN ALL CHANNELS
96
SET DEFECT PIXEL TO INDICATE CORRECTED PIXEL RELIABLE
98
MORE PIXELS ?
100
YES
NO
CONVERT BACK TO IMAGE SPACE
102
END
104

U.S. PATENT DOCUMENTS

| | | | | | |
|---|---|---|---|---|---|
| 5,155,596 | A | | 10/1992 | Kurtz et al. | 358/214 |
| 5,200,817 | A | | 4/1993 | Birnbaum | 358/80 |
| 5,266,805 | A | | 11/1993 | Edgar | 250/330 |
| 5,267,030 | A | | 11/1993 | Giorgianni et al. | 358/527 |
| 5,291,286 | A | | 3/1994 | Murakami et al. | 348/469 |
| 5,311,310 | A | | 5/1994 | Jozawa et al. | 348/416 |
| 5,335,086 | A | | 8/1994 | Kitamura | 358/431 |
| 5,371,542 | A | | 12/1994 | Pauli et al. | 348/262 |
| 5,447,811 | A | | 9/1995 | Buhr et al. | 430/20 |
| 5,448,380 | A | | 9/1995 | Park | 358/520 |
| 5,452,018 | A | | 9/1995 | Capitant et al. | 348/651 |
| 5,465,155 | A | | 11/1995 | Edgar | 358/500 |
| 5,465,163 | A | | 11/1995 | Yoshihara et al. | 358/444 |
| 5,477,345 | A | | 12/1995 | Tse | 358/500 |
| 5,509,086 | A | | 4/1996 | Edgar et al. | 382/167 |
| 5,516,608 | A | | 5/1996 | Hobbs et al. | 430/30 |
| 5,552,904 | A | | 9/1996 | Ryoo et al. | 358/518 |
| 5,561,611 | A | | 10/1996 | Avinash | 364/553 |
| 5,565,931 | A | | 10/1996 | Girod | 348/675 |
| 5,568,270 | A | | 10/1996 | Endo | 358/298 |
| 5,581,376 | A | | 12/1996 | Harrington | 358/518 |
| 5,582,961 | A | | 12/1996 | Giorgianni et al. | 430/508 |
| 5,583,950 | A | | 12/1996 | Prokoski | 382/212 |
| 5,589,887 | A | | 12/1996 | Wischermann | 348/616 |
| 5,608,547 | A | | 3/1997 | Nakatani et al. | 358/505 |
| 5,641,596 | A | | 6/1997 | Gray et al. | 430/21 |
| 5,666,443 | A | | 9/1997 | Kumashiro | 382/266 |
| 5,673,336 | A | | 9/1997 | Edgar et al. | 382/167 |
| 5,721,624 | A | | 2/1998 | Kumashiro et al. | 358/450 |
| 5,726,773 | A | | 3/1998 | Mehlo et al. | 358/474 |
| 5,729,631 | A | | 3/1998 | Wober et al. | 382/232 |
| 5,771,107 | A | | 6/1998 | Fujimoto et al. | 358/464 |
| 5,808,674 | A | | 9/1998 | Adams, Jr. et al. | 348/273 |
| 5,892,595 | A | | 4/1999 | Yamakawa et al. | 358/530 |
| 5,923,042 | A | | 7/1999 | Mietta et al. | 250/559.06 |
| 5,930,388 | A | | 7/1999 | Murakami et al. | 382/167 |
| 5,963,662 | A | | 10/1999 | Vachtsevanos et al. | 382/150 |
| 5,969,372 | A | | 10/1999 | Stavely et al. | 250/559.42 |
| 5,979,011 | A | | 11/1999 | Miyawaki et al. | 15/308 |
| 5,982,941 | A | | 11/1999 | Loveridge et al. | 382/260 |
| 5,982,951 | A | | 11/1999 | Katayama et al. | 382/284 |
| 5,991,444 | A | | 11/1999 | Burt et al. | 382/232 |
| 6,005,987 | A | | 12/1999 | Nakamura et al. | 382/294 |
| 6,057,040 | A | | 5/2000 | Hage | 428/447 |
| 6,075,905 | A | | 6/2000 | Herman et al. | 382/284 |
| 6,078,051 | A | | 6/2000 | Banton et al. | 250/341.1 |
| 6,078,701 | A | | 6/2000 | Hsu et al. | 382/294 |
| 6,101,273 | A | | 8/2000 | Matama | 382/169 |
| 6,128,416 | A | | 10/2000 | Oura | 382/284 |
| 6,134,343 | A | * | 10/2000 | Nichani | 382/141 |
| 6,181,830 | B1 | * | 1/2001 | Sato | 382/274 |
| 6,239,886 | B1 | | 5/2001 | Klassen et al. | 358/518 |
| 6,381,357 | B1 | * | 4/2002 | Tan et al. | 382/141 |
| 6,381,374 | B1 | * | 4/2002 | Pourjavid | 382/275 |
| 6,415,063 | B1 | * | 7/2002 | Pourjavid | 382/275 |
| 6,442,301 | B1 | * | 8/2002 | Edgar | 382/275 |
| 6,487,321 | B1 | * | 11/2002 | Edgar et al. | 382/260 |
| 6,587,592 | B2 | * | 7/2003 | Georgiev et al. | 382/254 |
| 6,625,318 | B1 | * | 9/2003 | Tan et al. | 382/224 |

FOREIGN PATENT DOCUMENTS

| | | | |
|---|---|---|---|
| EP | 0 422 220 A1 | 4/1991 | A61B/6/03 |
| EP | 0 482 790 B1 | 4/1992 | H04N/1/40 |
| EP | 0 527 097 A2 | 2/1993 | H04N/1/40 |
| EP | 0 569 142 A1 | 11/1993 | H04N/5/253 |
| EP | 0 624 848 A2 | 11/1994 | G06F/15/68 |
| EP | 0 669 753 A2 | 8/1995 | H04N/1/407 |
| EP | 0 716 538 A2 | 6/1996 | H04N/1/50 |
| EP | 0 751 670 A2 | 1/1997 | H04N/1/10 |
| EP | 0 768 621 A2 | 4/1997 | G06T/5/20 |
| EP | 0 794 454 A2 | 9/1997 | G03B/27/73 |
| EP | 0 816 833 A2 | 1/1998 | G01N/21/88 |
| EP | 0 816 833 A3 | 8/1998 | G01N/21/88 |
| EP | 0 893 914 A2 | 1/1999 | H04N/5/253 |
| GB | 2 283 633 A | 5/1995 | H04N/5/262 |
| JP | 4-291139 | 10/1992 | G01N/21/89 |
| JP | 11185028 | 7/1999 | G06T/1/00 |
| JP | 2000-13604 | 1/2000 | H04N/1/409 |
| JP | 2000-196813 A | 7/2000 | |
| WO | WO 84/02019 | 5/1984 | G06F/15/20 |
| WO | WO 89/06890 | 7/1989 | H04N/3/36 |
| WO | WO 90/01240 | 2/1990 | H04N/1/40 |
| WO | WO 91/09493 | 6/1991 | H04N/5/127 |
| WO | WO 92/05469 | 4/1992 | G03B/27/53 |
| WO | WO 95/15530 | 6/1995 | G06F/17/14 |
| WO | WO 97/16028 | 5/1997 | H04N/7/30 |
| WO | WO 98/31142 | 7/1998 | H04N/5/253 |
| WO | WO 98/34397 | 8/1998 | |
| WO | WO 99/40729 | 8/1999 | H04N/9/11 |
| WO | WO 01/48694 | 7/2001 | G06T/5/00 |

OTHER PUBLICATIONS

*2–D Adaptive Volterra Filter for 2–D Nonlinear Channel Equalisation and Image Restoration*, J.N. Lin, et al., Electronics Letters, vol. 28, No. 2, Jan. 16, 1992, pp. 180–182.

*New Adaptive Vector Filter Based on Noise Estimate*, Mei Yu, et al., IEICE Trans Fundamentals, vol. E82 A, No. 6, Jun., 1999, pp. 911–919.

*A Robust Method for Parameter Estimation of Signal–Dependent Noise Models in Digital Images*, B. Aiazzi, et al., IEEE, 1997, pp. DSP 97—601–604.

*A Regularized Iterative Image Restoration Algorithm*, Aggelos K. Katsaggelos, et al., IEEE, 1991, pp. 914–929.

*Adaptive Fourier Threshold Filtering: A Method to Reduce Noise and Incoherent Artifacts in High Resolution Cardiac Images*, M. Doyle, et al., 8306 Magnetic Resonance in Medicine, May, 31, 1994, No. 5, Baltimore, MD., pp. 546–550.

*Anisotropic Spectral Magnitude Estimation Filters for Noise Reduction and Image Enhancement*, Til Aach, et al., IEEE, 1996, pp. 335–338.

*Adaptive–neighborhood filtering of images corrupted by signal–dependent noise*, Rangaraj M. Rangayyan et al., Applied Optics, vol. 37, No. 20, Jul. 10, 1998, pp. 4477–4487.

*Grayscale Characteristics*, Photographic Negatives The Nature of Color Images, pp. 163–168.

*Digital Imaging Equipment White Papers*, Putting Damaged Film on Ice, A Technical Discussion of Advances in Digital Imaging, Nikon Corporation, http://www.nikonusa.com/reference/whitepapers/imaging/ditechdisc.html, Aug. 5, 1999.

*Local Cosine Transform—A Method for the Reduction of the Blocking Effect in JPEG*, Gil Aharoni, et al., Journal of Mathematical Imaging and Vision, 3, pp. 7–38, 1993.

* cited by examiner

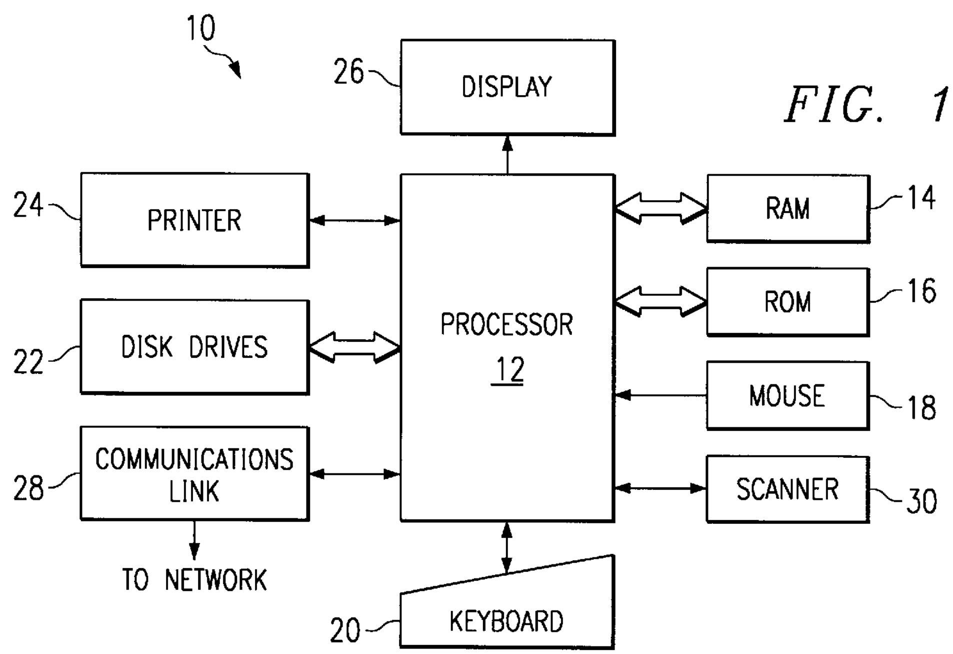

10
26
DISPLAY
FIG. 1
24
PRINTER
RAM
14
ROM
16
22
DISK DRIVES
PROCESSOR
12
MOUSE
18
28
COMMUNICATIONS LINK
SCANNER
30
TO NETWORK
20
KEYBOARD

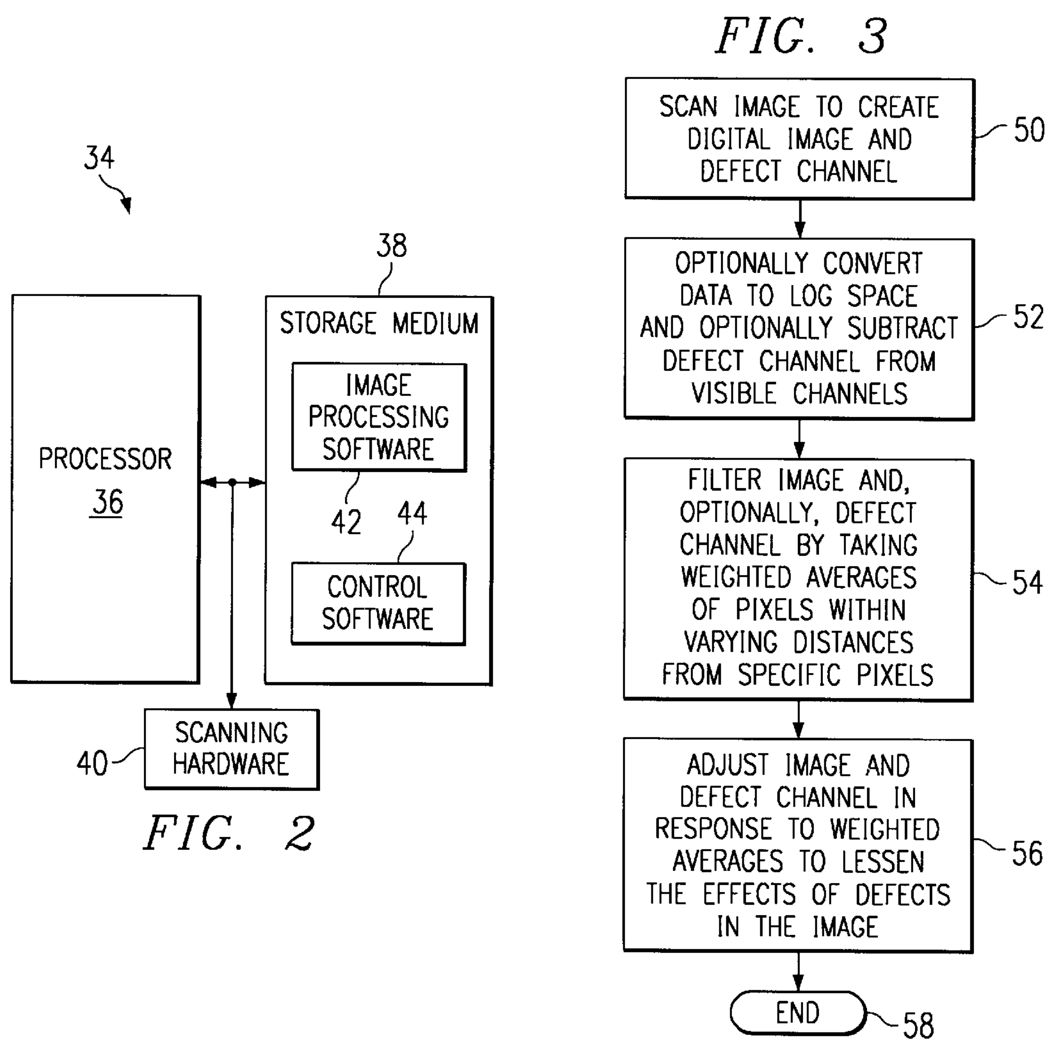

FIG. 3
SCAN IMAGE TO CREATE DIGITAL IMAGE AND DEFECT CHANNEL
50
34
38
OPTIONALLY CONVERT DATA TO LOG SPACE AND OPTIONALLY SUBTRACT DEFECT CHANNEL FROM VISIBLE CHANNELS
52
STORAGE MEDIUM
IMAGE PROCESSING SOFTWARE
PROCESSOR
36
42
44
FILTER IMAGE AND, OPTIONALLY, DEFECT CHANNEL BY TAKING WEIGHTED AVERAGES OF PIXELS WITHIN VARYING DISTANCES FROM SPECIFIC PIXELS
54
CONTROL SOFTWARE
40
SCANNING HARDWARE
FIG. 2
ADJUST IMAGE AND DEFECT CHANNEL IN RESPONSE TO WEIGHTED AVERAGES TO LESSEN THE EFFECTS OF DEFECTS IN THE IMAGE
56
END
58

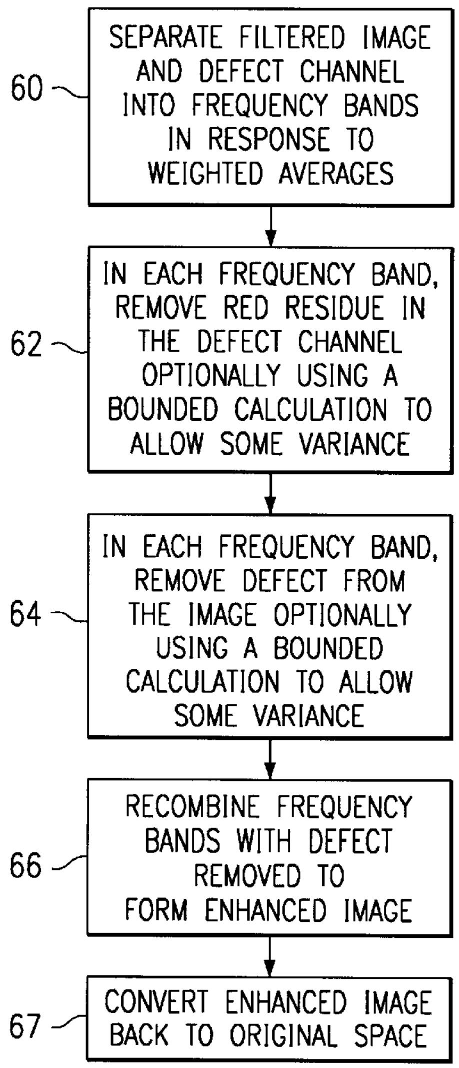
FIG. 4
SEPARATE FILTERED IMAGE AND DEFECT CHANNEL INTO FREQUENCY BANDS IN RESPONSE TO WEIGHTED AVERAGES
60
IN EACH FREQUENCY BAND, REMOVE RED RESIDUE IN THE DEFECT CHANNEL OPTIONALLY USING A BOUNDED CALCULATION TO ALLOW SOME VARIANCE
62
IN EACH FREQUENCY BAND, REMOVE DEFECT FROM THE IMAGE OPTIONALLY USING A BOUNDED CALCULATION TO ALLOW SOME VARIANCE
64
RECOMBINE FREQUENCY BANDS WITH DEFECT REMOVED TO FORM ENHANCED IMAGE
66
CONVERT ENHANCED IMAGE BACK TO ORIGINAL SPACE
67

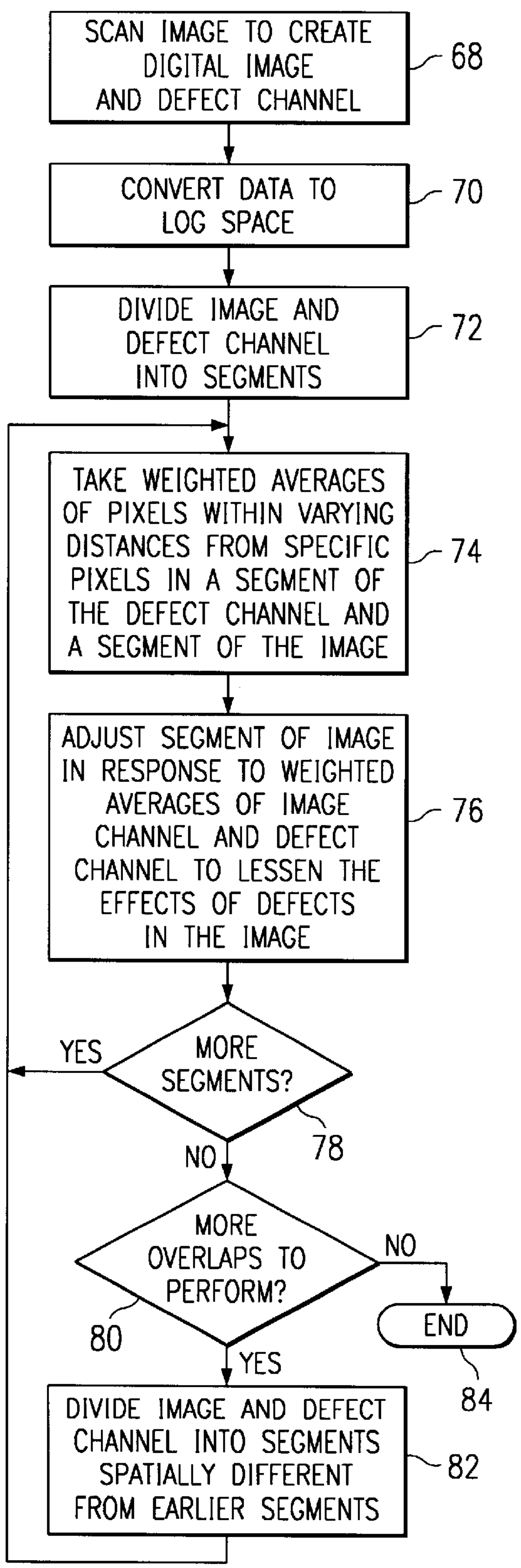
FIG. 5
SCAN IMAGE TO CREATE DIGITAL IMAGE AND DEFECT CHANNEL
68
CONVERT DATA TO LOG SPACE
70
DIVIDE IMAGE AND DEFECT CHANNEL INTO SEGMENTS
72
TAKE WEIGHTED AVERAGES OF PIXELS WITHIN VARYING DISTANCES FROM SPECIFIC PIXELS IN A SEGMENT OF THE DEFECT CHANNEL AND A SEGMENT OF THE IMAGE
74
ADJUST SEGMENT OF IMAGE IN RESPONSE TO WEIGHTED AVERAGES OF IMAGE CHANNEL AND DEFECT CHANNEL TO LESSEN THE EFFECTS OF DEFECTS IN THE IMAGE
76
MORE SEGMENTS?
YES
NO
78
MORE OVERLAPS TO PERFORM?
NO
YES
80
END
84
DIVIDE IMAGE AND DEFECT CHANNEL INTO SEGMENTS SPATIALLY DIFFERENT FROM EARLIER SEGMENTS
82

METHOD AND SYSTEM FOR ALTERING DEFECTS IN DIGITAL IMAGE

RELATED APPLICATIONS

This application claims the benefit of U.S. Provisional Application Ser. No. 60/160,500, filed Oct. 20, 1999 by Raymond Shaw Lee entitled, “Method and System for Altering Defects in a Digital Image”.

This application is related to U.S. application Ser. No. 08/999,421, filed on Dec. 29, 1997, by Albert Edgar and entitled, “Defect Channel Nulling.”

The application is related to U.S. Pat. No. 6,487,321 issued on Nov. 26, 2002, by Albert Edgar, et al. and entitled, “Method and System for Altering Defects in a Digital Image.

TECHNICAL FIELD OF THE INVENTION

This invention relates generally to image processing and more particularly to a method and system for altering defects in a digital image.

BACKGROUND OF THE INVENTION

Tangible images, such as photographic images, may have surface defects such as scratches, fingerprints, or dust particles. Such defects may occur, in the case of photographic images, in a transparency or negative as well as in a photographic print of a transparency or negative. Such defects often undesirably degrade a photographic image.

In the field of image processing, digital images derived from photographic images using a scanner most often include the defects present in the underlying photographic image. Because digital images are subject to mathematical manipulation, if image defects may be identified and distinguished from image detail, then those defects can be removed, either partially or completely.

A defect channel comprising a digital signal proportional to the defects in a photographic image may be created by scanning the photographic image using an infrared light source and an infrared light sensor. Infrared light will tend to pass through developed photographic film with nearly complete transmission because the dye in various layers of the photographic film does not fully absorb infrared light. On the other hand, where defects are present, a portion of the infrared light will tend to be refracted from the optical path before passing through the film. Thus, defects in the photographic image will tend to show up in a defect channel produced using an infrared light source and infrared sensor. In reflective scanners, a defect channel may be obtained by examining the difference between images obtained when the image being scanned is illuminated by light sources at different angles. The challenge is to use the defect channel to automatically alter defects in a digital image, while making as few undesirable changes to the digital image as possible.

SUMMARY OF THE INVENTION

One aspect of the invention is a method for correcting a digital image representative of a tangible image. A first corrected intensity value for a first pixel of a first channel of the digital image is calculated using electronic circuitry in response to the intensity of a first defect pixel in a defect channel associated with the digital image. The original intensity value of the pixel is replaced with the first corrected intensity value. The intensity of the defect pixel is replaced with an intensity value signifying that the first pixel is reliable. A second corrected intensity value is then calculated for a second pixel of the first channel of the digital image in response to the intensity of the first pixel after replacement and the intensity of the first defect pixel after replacement.

The invention has several important technical advantages. Various embodiments of the invention may have none, one, some, or all of these advantages without departing from the scope of the invention. The invention allows automatic alteration of defects in a digital image based upon a defect channel having a signal proportional to defects in the digital image. The invention allows such defect correction to be performed in place without creation of a separate output image. Thus, the invention may allow sophisticated defect correction techniques to be used with a significant reduction in the amount of memory used to perform the correction.

BRIEF DESCRIPTION OF THE DRAWINGS

For a more complete understanding of the present invention and the advantages thereof, reference is now made to the following descriptions taken in conjunction with the accompanying drawings in which:

FIG. 1 illustrates a block diagram of a general purpose computer that may be used in accordance with the present invention;

FIG. 2 illustrates an example of a scanner that comprises an embodiment of the present invention;

FIG. 3 illustrates a flow chart describing the alteration of a defect in a digital image in accordance with one method of the present invention;

FIG. 4 illustrates a flow chart describing adjustment of an image in response to weighted averages produced by filtering an image in accordance with the present invention;

FIG. 5 illustrates a flow chart describing a second method of altering defects in a digital image in accordance with the present invention;

DETAILED DESCRIPTION OF THE INVENTION

Figure 6:
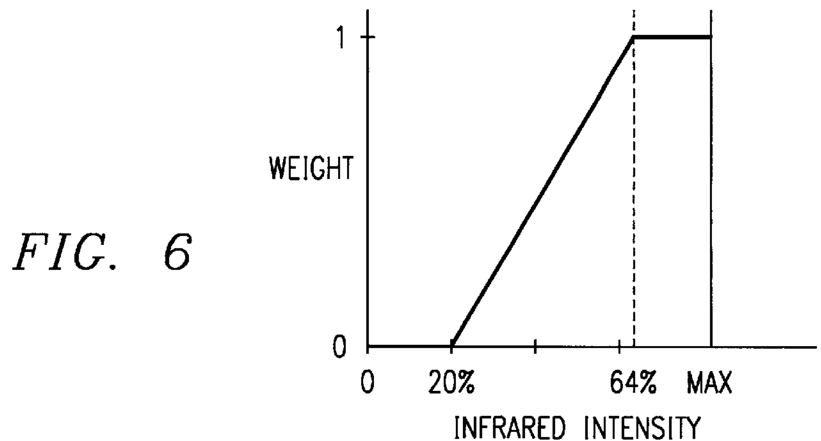
FIG. 6 illustrates a graph of an example weighting function that may be used with the present invention.

The preferred embodiment of the present invention and its advantages are best understood by referring to FIGS. 1–7 of the drawings, like numerals being used for like and corresponding parts of the various drawings.

FIG. 1 illustrates a general purpose computer 10 that may be used for image enhancement in accordance with the present invention. Specifically, general purpose computer 10 may comprise a portion of a digital image processing system and may be used to execute applications comprising image enhancement software. General purpose computer 10 may be adapted to execute any of the well known MS-DOS, PC-DOS, OS2, UNIX, MAC-OS and Windows operating systems or other operating system. General purpose computer 10 comprises processor 12, random access memory (RAM) 14, read only memory (ROM) 16, mouse 18, keyboard 20, and input/output devices such as printer 24, disk drives 22, display 26 and communications link 28. The present invention includes programs that may be stored in RAM 14, ROM 16, or disk drives 22 and may be executed by processor 12. Communications link 28 is connected to a computer network but could be connected to a telephone line, an antenna, a gateway, or any other type of communication link. Disk drive 22 may include a variety of types of storage media such as, for example, floppy disk drives, hard disk drives, CD ROM drives, or magnetic tape drives. Although this embodiment employs a plurality of disk drives 22, a single disk drive 22 could be used without departing from the scope of the invention. FIG. 1 only provides one example of a computer that may be used with the invention. The invention could be used with computers other than general purpose computers as well as general purpose computers without conventional operating systems.

General purpose computer 10 further comprises scanner 30 that may be used to scan images that are to be enhanced in accordance with the teachings of the invention. In this embodiment, enhancement may be performed by software stored and executed by scanner 30 with the results stored in a storage medium comprising a part of scanner 30 and/or in any of the storage devices of general purpose computer 10. Alternatively, software for image enhancement may be stored in any of the storage media associated with general purpose computer 10 and may be executed by processor 12 to enhance images scanned by scanner 30. In addition, image enhancement could occur both internally within scanner 30 and in general purpose computer 10 without departing from the scope of the invention. Scanner 30 may comprise a film scanner or a flatbed scanner of any type without departing from the scope of the invention. Image enhancement may also be performed using special purpose digital circuitry contained either in scanner 30, general purpose computer 10, or in a separate device. Such dedicated digital circuitry which may include, for example, state machines, fuzzy logic, etc.

FIG. 2 illustrates an exemplary scanner 34 constructed in accordance with the invention. Scanner 34 comprises processor 36, storage medium 38 and scanning hardware 40. Processor 36 controls the operation of scanning hardware 40 by executing control software 44 stored in storage medium 38. Although a single storage medium has been illustrated for simplicity, storage medium 38 may comprise multiple storage mediums as well as comprising storage mediums of different types. Thus, for example, control software 44 may be stored in ROM memory, RAM memory, or on a disk drive. Scanning hardware 40 is used to convert an analog image into a digital image utilizing some type of optical circuitry. In addition, optical circuitry may also be used to produce a defect channel proportional to defects in the analog image. Any type of optical circuitry could be used for scanning hardware 40 without departing from the scope of the invention. For the defect channel, a light source comprised mostly of energy outside the visible spectrum and a matching sensor may be used to create the defect channel. For example, an infrared light source and sensor such as those typically used in image processing applications involving photographic images may be used for this aspect of the scanning hardware.

If scanner 34 comprises a reflective scanner, then a defect channel can be derived from a plurality of scanned versions of the image in the visible spectrum. Such a defect channel may be derived by illuminating the image being scanned at two or more angles and calculating changes in the scanned image at the plurality of angles. Defects will tend to affect the light differently when illumination is made from different angles. Other types of scanning hardware may be used to create a defect channel without departing from the scope of the invention.

After scanning hardware 40 has scanned an image, that image may be enhanced (by altering defects within it) in accordance with the invention using image processing software 42, which is stored in storage medium 38. Alternatively, rather than using software running on a processor (one type of digital circuitry), the invention may employ other types of digital circuitry comprising any type of dedicated digital hardware to alter defects in the digital image. This hardware may be a part of scanner 34 or general purpose computer 10 as discussed above. Similarly, the scanned image may be stored in storage medium 38 as may the enhanced image. Alternatively, scanner 34 may not have any image processing software 42. Such software instead may be provided on general purpose computer 10 for enhancement of an image received from scanner 34. Enhancement may occur both in scanner 34 and general purpose computer 10 as well. Accordingly, a scanned image and/or an enhanced scanned image may be provided by scanner 34 to the general purpose computer 10 through a communications port (not explicitly shown). The defect channel may be similarly provided. Although one embodiment of an exemplary scanner 34 that may be used for image enhancement in connection with the invention has been illustrated, other scanners may be used without departing from the scope of the invention.

FIG. 3 illustrates a flow chart describing a method employed by one embodiment of the present invention to enhance a digital image. The image enhancement described herein may be carried out using computer software, as can any of the processes described below. That software, as discussed above, may be executed by scanner 34, by general purpose computer 10, or a combination thereof. A digital image received from other than scanner 30 may be enhanced in accordance with the invention.

The method described in FIG. 3 may be used to alter defects in many types of images such as color photographic images (either negative print or transparency), black and white images (either negative print or transparency and including black and white images derived from photographic film with multiple layers), other monochromatic images, x-rays or any other type of image stored on film. The invention may also be used to alter defects in any image on a tangible medium that may be scanned using a scanner.

In step 50, an image is scanned to create a digital image and defect channel. As noted, however, this step could be omitted and the invention carried out on a image that has been previously scanned and has a defect channel associated with it. In the case of a color image, the digital image will typically be comprised of three channels: a red channel, a green channel, and a blue channel. Each channel is comprised of a series of pixels with each pixel having an intensity value associated with it corresponding to the intensity of the particular color of light at that spatial location in the original image. Other types of color images can be used without departing from the scope of the invention. In addition, it is within the scope of the invention to convert a color image into a black and white image for alteration of defects in the image. The enhanced image with the altered defects could then be converted back into a color image. The methods of the invention could also be applied to a single color channel of a digital image and the same correction could be applied to all channels of the digital image. A black and white image may comprise one or more channels similarly made up of pixels. Other types of images may also comprise one or more similar channels. The invention can be used for any of these types of images.

The defect channel comprises a series of pixels, each having an intensity value either directly proportional or inversely proportional to defects (or the lack thereof) in the original image. Such a defect channel may be created, for example, using an infrared light source and infrared sensor of the kind commonly used in image processing applications involving photographic film. Other types of light sources and sensors may be used to create the defect channel, such as described above in connection with reflective scanners, for example. Any other method may be used to generate a suitable defect channel without departing from the scope of the invention. Such a defect channel will ordinarily produce a signal having a stronger correlation to defects in the original image and a weaker correlation to the visible image itself.

Steps 52–58 comprise a method for altering defects in a digital image to produce an enhanced digital image. Before describing the process in detail, it may be helpful to describe it generally. To enhance a digital image by altering defects in the digital image, the invention corrects defects in at least two frequency bands. The term "correction" or "correct" when used in this application, refers broadly to altering defects in a digital image. An image defect does not need to be completely removed or completely corrected to fall within the scope of the invention. Accordingly, defect correction includes, but is not limited to, reduction or other alteration of a defect in a digital image. The frequency bands for the image are created using one or more filters which average pixels in the neighborhood of a pixel in question with each pixel weighted according to its expected reliability. The expected reliability is determined by the intensity value in the defect channel of the pixel in question or the pixel in question plus a series of pixels in the neighborhood of the pixel in question. Pixels that appear to be more reliable based upon the defect channel are weighted more heavily than those with a low expected degree of reliability. The defect channel may be similarly divided into frequency bands.

The effect of each weighted averaging operation is to create a low pass filtered version of the original image. Where multiple averaging operations are performed, multiple low pass filtered versions of the original image are derived, most often with different bandwidths. These multiple lowpass filtered versions, along with the original image may be used to derive a representation of the original image in multiple contiguous frequency bands. By subtracting one low pass filtered version from another, a bandpass representation for one band may be derived where common frequencies are eliminated. A series of bands can be created similarly, as further described below.

The filtered representations of the digital image may then be processed such that the original image is divided into a plurality of frequency bands which collectively make up all or substantially all frequencies present in the original image but overlap little, if at all. These bands may then be recombined to produce an image with defects removed.

The same filtering operation may optionally be performed on the defect channel. Defects may then be further removed, frequency band by frequency band, by subtracting the defect channel bands from the image frequency bands. An enhanced image is then constructed by combining the corrected individual frequency bands back together again.

In step 52, data is optionally converted to log space for the defect channel and for each channel of the digital image where defect correction is to be performed. The conversion of data to logarithmic space may enable the remaining steps of the method to be performed more easily than if the conversion were not made. For example, several of the operations described below involve additions and subtractions in log space, but could involve division by zero in non-log space. Because division by zero can lead to erroneous results, it may be more convenient to carry out the process of the invention in log space. However, the performance of mathematically equivalent functions outside of log space could also be used in connection with the invention.

Although any type of logarithmic calculation can be used, one embodiment of the invention uses the conversion to log space described by Formula 1.

$$Y(x) = \frac{\mathrm{Log}_{10}(x+1)\mathrm{Log}_{10}4095}{\mathrm{Log}_{10}4096} \quad (1)$$

In Formula 1, "x" represents the intensity value of the pixel to be converted to log space. Each such pixel in this embodiment comprises a twelve-bit intensity value. Other numbers of bits can be used without departing from the scope of the invention. Depending upon how the invention is carried out, convenient conversions may be made to take into account the capabilities of digital hardware used to perform calculations in accordance with the invention.

If data is converted to log space, and the defect channel is suitable, then a first type of defect correction may be carried out by subtracting the defect channel from each of the visible image channels. Such a subtraction may be a direct subtraction or a bounded subtraction, analogous to the bounded subtraction described below in connection with FIG. 5. This subtraction may also take into account red leakage and clear film values where the defect channel is derived using an infrared source and sensor in a film scanner. Any method of taking into account these effects (which are described below) is within the scope of the invention. Defect channels obtained using infrared light in film scanners will often be suitable for this optional enhancement of the image. Even in such a case, however, this step is optional. An alternative to this optional subtraction is to subtract the defect channel from the image channel, frequency band by frequency band, after enhancement by weighted filtering as described below. This alternative is also optional and may be done where a suitable defect channel is available. The defect channel may be suitable where pixel intensity values in the defect channel are proportional, either directly or inversely, to defects and vary approximately linearly with the amount of light blocked by the defect.

In step 54, the image and defect channel are filtered by taking weighted averages of pixels within varying distances from specific pixels. As noted above, each channel of the image may be filtered, the channels may be combined into a single channel and the combined channel filtered or a subset of the channels can be combined or filtered individually and the defect correction applied based upon results obtained from those channels without departing from the scope of the invention. Depending upon the type of enhancement used, the filtering of the defect channel is also optional.

The weighting applied to a specific pixel in calculating the weighted averages may be based upon the expected reliability of that pixel. The expected reliability of a pixel may be determined by using the defect channel. As used herein, "a weighted average" or "averaging" or any similar term refers to any type of average such as a median average, mode average, mean average, arithmetic average, or geometric average. The calculation of weighted averages of pixels around the pixels in each channel of the digital image has the effect of filtering each channel with different strengths of low pass filters. The effect of weighting each pixel (or a subset of the pixels) involved in the calculation of the averages based upon the expected reliability of each pixel dampens the effect of the defect in each filtered version of the original channel of the digital image.

An example may illustrate the calculation of the weighted averages. In this example, four filtering operations are performed: a 3×3 weighted average, a 5×5 weighted average, a 9×9 weighted average, and a 17×17 weighted average. In this example, each of these four weighted averages is computed for each pixel in each pixel in the digital image. Any pixel outside the boundaries of the image is set to zero for purposes of these calculations. For a particular pixel, the 3×3 weighted average is computed using a 3×3 matrix of pixels with the pixel in question at the center of the matrix. Thus, pixels in the neighborhood of the pixel in question are used to calculate the weighted average. The weight applied to each pixel corresponds to its expected reliability as determined using a corresponding pixel or pixels in the defect channel. The weighted average is computed by summing the product of the intensity of each pixel times the weight and dividing the total sum by the sum of the weight values that were applied to each pixel. The 5×5, 9×9, and 17×17 filters are calculated similarly.

The calculation of the four discussed weighted averages at each pixel results in four low pass filtered versions of the original channel of the digital image. The 3×3 weighted average applied to each pixel of the image channel produces a low pass filtered version of the image having spatial frequencies between essentially zero and one-third of the maximum spatial frequency possible in the image. Similarly, the 5×5 weighted average produces a low pass filtered version of the original channel of the digital image having frequencies predominantly between zero and one-fifth of the maximum spatial frequency possible in the image. The 9×9 and 17×17 weighted averages produce filtered versions with frequencies predominantly between zero and one-ninth the maximum spatial frequency possible in the image and predominantly between zero and one-seventeenth the maximum spatial frequency possible in the image. Due to the weighting applied to each pixel during this filtering operation, the filtered versions in each frequency band have had the effects of defects reduced. Low pass filtering alone tends to dampen the effects of defects, but may also blur image detail. The weighting may dampen the effects of a defect more than low pass filtering alone would with proportionally less reduction of image detail. This example will be used below to further illustrate adjustment of the image and defect channel. The same filtering operation may also be performed on the defect channel, if desirable for use in further reduction of defects.

Numerous options may be used for calculating the weighted average of a pixel and other pixels in the neighborhood of the pixel. The filter can have a square shape (as in the example above), a circle shape, or any other type of shape without departing from the scope of the invention. The filter may be symmetric or asymmetric and may be centered or not centered on the pixel in question. The filter may also be a window with feathered edges. In addition, any number of filters can be used. The use of more filters will allow division of the image into a greater number of frequency bands. The use of additional filters, however, requires additional calculation. Less filters than those used in the above example can also be used without departing from the scope of the invention.

The filters in the example above had particular dimensions each of which are approximately double the dimensions of the previous filter. Any size filters can be used, however, without departing from the scope of the invention. In the example above, any pixel outside the boundaries of the image was set to an intensity value of zero for purposes of the weighted average calculation. Other boundary conditions could be used without departing from the scope of the invention; for example, soft edge boundary conditions such as a triangle edge or gaussian edge could be used.

In the example above, the weighted average was computed for each pixel in each channel of the digital image and in the defect channel. The weighted average could also be performed on a subset of the pixels in a channel or on all of the pixels in a subset of the channels without departing from the scope of the invention. In addition, different weights could be used for each frequency band and could be omitted in some frequency bands. Different weights could also be used for different channels.

The weighting used for a particular pixel can be determined in several ways. The weighting could depend upon the intensity of a spatially corresponding pixel in the defect channel. Where the weighting is applied to the defect itself, the weighting could be determined based upon the intensity of each pixel involved in the calculation. The same or different weightings could be used for the defect channel and one or more image channels. The defect channel, however, may be blurred compared to the visible channel due to focal shifts, the nature of the defects, and inconsistent registration between the visible channels of the digital image and the defect channel, for example. Accordingly, it may be desirable to estimate the reliability of a pixel and determine its weight by taking into consideration a plurality of pixels surrounding a pixel in the defect channel corresponding to the pixel in a visible image channel that is the subject of the weighted average calculation. Alternatively, if blurring effects are insignificant and registration error is fairly constant, then the pixel used in the defect channel could be chosen while compensating for the constant registration error.

The particular weighting function chosen may depend upon the characteristics of the particular scanner used to create the defect channel. The weighting applied may be a function of the intensity value of a pixel or pixels in the defect channel. Where multiple pixels are used to determine a weight, an average or weighted average of the pixels may be used to come up with an average intensity used to determine a weight.

Any type of function may used to relate a weight to the intensity of a pixel in the defect channel or average intensity of a series of pixels in the defect channel. A straight line may be used to establish this function or any other type of curve may be used. In this example, a high threshold and a low threshold may be determined based upon the characteristics of an infrared channel produced by a scanner. For example, in one embodiment, a weight of one may be assigned for all pixel values greater than a particular high threshold where the threshold provides high predictability that no defect is present. A weight of zero may be assigned when the intensity value is below a certain low threshold indicating a high probability that a defect is present with little or no image detail remaining. For points with an intensity in between these threshold values, a straight line or other curve can be used to connect the two thresholds to establish a continuous function for weights between zero and one. Pixels with intensity in this middle region tend to be ones that are defective but some image detail remains to allow enhancement of the digital image to remove the defect but maintain some image detail. In the case of a defect channel derived from a reflective scanner using illumination from multiple angles, the intensity of the pixels in the defect channel may lack a linear relationship to the amount of light that passes through a defect. With such a defect channel, a discrete set of weights such as 0, 1/2 and 1, may be used.

An example of a weight function is illustrated in FIG. 6. In FIG. 6, infrared intensity in the defect channel will be high when no defect is present as most or all of the infrared energy is allowed to pass through the film. Where a defect is present, however, infrared intensity will be low. In this example, all likely defective pixels (those with an infrared intensity in the defect channel less than 20 percent) are set to a weight of zero. All pixels with a high probability of being non-defective pixels (those with an infrared intensity in the defect channel greater than 64 percent of the maximum intensity are assigned a weight of one). Pixels in the region in between are assigned a weight based upon the illustrated curve. Again, more complicated functions may be used without departing from the scope of the invention.

The weighting applied may also compensate for effects such as leakage from the red channel of a color image into the defect channel. This leakage may result because infrared light sources and/or sensors are residually sensitive to the cyan dye in an image used to modulate the red region of the visible spectrum. This effect manifests itself as an apparent leakage of the red image into the infrared image. The effects of red leakage can be taken into account when establishing a weight value. For example, an overall red leakage value for an image may be calculated. This red leakage value can then be used to establish a constant to be multiplied times a pixel intensity value in the red channel. This product may represent an estimate of the amount of the red channel present in the defect channel for that particular pixel. Thus, in calculating a weight, this product may be subtracted from the intensity of the pixel in the defect channel.

Similarly, a portion of the intensity in the defect channel is proportional to the intensity that would result if infrared light was passed through clear film. Different types of film produce different intensity values when infrared is passed through the clear film. Accordingly, the weight may also be adjusted by subtracting the average clear film value for a particular digital image.

Depending upon the type of filtering employed, one could filter the image once with one or more filters and then filter the corrected image again with different filters. A decision could be made as to whether to apply the second filtering step based upon the estimated size of defects as determined by the defect channel.

In Step 56, the channels of the digital image and the defect channel are adjusted in response to the weighted averages to lessen the effects of defects in the image. The invention includes any use of the weighted averages computed in Step 54 to adjust an image to lessen the effects of defects in the image. A specific method for adjusting the digital image in response to the weighted averages will be discussed below in connection with FIG. 4. Such adjustment could occur in the time domain or the frequency domain and, when in the spatial domain, in log space or any other space. After the image has been adjusted to lessen the effects of defects, the process terminates in Step 58.

Besides the method described below in connection with FIG. 4, another possible method of enhancement is to create a series of essentially contiguous frequency bands based upon the plurality of weighted averages of the original image and the original image itself. The process of creating these bands may be as described below in connection with step 60 of FIG. 4. After these bands have been created, they may be added together to form an enhanced version of the original image with the defects reduced. This method may be used, for example, where the defect channel is unsuitable for subtraction from the image. This method could, however, be used even where a defect channel is suitable for correction. The enhanced image may also be further enhanced by other operations without departing from the scope of the invention. If the pixel data was converted to log space in step 52, the enhanced pixel data may be converted back to the space of the original image using a suitable inverse formula such as an inverse to Formula 1.

FIG. 4 illustrates one example of a method for adjusting images in response to weighted averages to lessen the effects of defects in the digital image. In step 60, the filtered digital image (which comprises the original digital image and the filtered versions of the digital image calculated in Step 54) and the filtered defect channel (which consists of the original defect channel and the filtered versions of the defect channel obtained in step 54) are separated into frequency bands in response to the calculated weighted averages. In general, the filtered images and the original image are used to create a series of frequency bands with little or no overlap representative of the original digital image and original defect channel with defective pixels suppressed due to the weighting that took place during the filtering operation. This method assumes that the defect channel was filtered in FIG. 3.

Using the example discussed above in connection with FIG. 3, five frequency bands may be created using the four weighted averages calculated. For purposes of the following, $F_m$ represents the maximum spatial frequency that can exist in the digital image. For a particular channel of the digital image or for the defect channel, the five frequency bands corresponding to the channel in question may be created using the weighted averages computed for that channel. The frequency band from approximately 1/3 $F_m$ to $F_m$ comprises the difference between the original channel and the 3×3 weighted average filtered version of that channel. The frequency band from approximately 1/5 $F_m$ through 1/3 $F_m$ may be calculated by subtracting the 5×5 weighted average version of the channel from the 3×3 weighted average version of the original channel. The frequency bands from approximately 1/5 $F_m$ to 1/9 $F_m$ and approximately 1/17 $F_m$ to 1/9 $F_m$ may be determined by subtracting the 9×9 weighted average version of the original channel from the 5×5 version of the original image channel and by subtracting the 17×17 weighted average version of the original channel from the 9×9 weighted average version of the original channel, respectively. Finally, the frequency band from approximately zero to 1/17 $F_m$ is represented by the 17×17 weighted average version of the original image channel.

In general, the low pass filtered versions of the image and defect channel created using the weighted averages can be used to divide each channel of the image as well as the defect channel into contiguous frequency bands where some or all of the frequency bands have had the effect of defects suppressed using the weighted average calculations.

In Step 62, the red residue in each frequency band of the defect channel may be removed. Optionally, such residue may be removed using a bounded calculation to allow some variance. If infrared sources and sensors (or other sources and sensors) are used that do not leave red residue in the defect channel, then the step may be omitted without departing from the scope of the invention. One option for removing the red leakage from the defect channel is to subtract from the intensity value of each pixel in the defect channel, the product of the intensity of the corresponding pixel in the red channel multiplied by an average red leakage constant representing the average red leakage for the entire digital image. This difference may be divided by the difference between one and the red leakage value to properly normalize the result. Alternatively, because red leakage may vary within regions of particular images, it may be useful to use a bounded subtraction to allow for some variance in localized red leakage values.

An example of a bounded subtraction for red residue will be provided in connection with FIG. 5 below. In general, two or more subtractions are performed from the intensity value in the defect channel. The product of the intensity value for the pixel in question in the red channel is multiplied by the red leakage constant adjusted upward for one subtraction and adjusted downward for a second subtraction from the intensity value in the defect channel. These results are divided by the difference between one and the appropriate adjusted red leakage constant. If both calculations have results having the same sign (i.e., both are positive or both are negative) then the smaller result is chosen. If the results have opposite signs, then the pixel in question is set to zero. Besides allowing variance in the red leakage value, such a bounded subtraction may compensate for registration error between visible channels of the digital image and the defect channel as well as for blurring that may occur in the defect channel.

In Step 64, defects are further removed from the image by subtracting the relevant frequency band of the defect channel obtained in Step 62 from the relevant frequency band in each image channel obtained in Step 60. Optionally, a bounded calculation such as that described in connection with Step 62 may be used to allow for some variance caused by registration error, blurring, etc. in the defect channel.

Next, in Step 66, the frequency bands are recombined through a summation to form an enhanced image with the original defect removed. In Step 67, the enhanced image is converted back from log space to the original space from which it was derived using a suitable inverse formula such as an inverse to Formula 1. If the enhanced image was created in a space other than log space, then Step 67 may be omitted without departing from the scope of the invention. If Step 60 through 66 were carried out in the frequency domain, then the enhanced image may be reconverted back to the time domain in Step 67.

FIG. 5 illustrates a flow chart describing a second method of enhancing an image by altering defects in the image in accordance with the invention. In this embodiment, an image may be divided into segments and defects processed within each individual segment. By dividing the image into segments, the amount of storage space used at any one time to enhance the image may be reduced, and the amount of computation required may be reduced. Thus, in this embodiment, the image is divided into segments and a process similar to that discussed above in connection with FIGS. 3 and 4 is applied to each segment individually as if that segment comprised the entire image.

In step 68 an image is scanned to create a digital image comprising one or more channels and a defect channel. All of the options discussed above in connection with step 50 are available for this embodiment of the invention. Next, in step 70 the data from the defect channel and the channels of the digital image is converted to log space. Again, any of the options discussed above in connection with step 52 may be employed in step 70, including optional subtraction of the defect channel from the visible channel.

In step 72, each channel of the digital image and the defect channel may be divided into segments. Any size or shape of segments may be used without departing from the scope of the invention. In one embodiment, each channel of the digital image and the defect channel are divided into 8×8 segments. This example will be used to illustrate the remainder of the steps of the method illustrated in FIG. 5.

In step 74, weighted averages of pixels within varying distances from specific pixels in a segment of the defect channel and a segment of each channel of the image are computed. These weighted averages are computed similarly to the weighted averages that were computed in step 54. However, the weighted averages computed in step 74 are computed for an individual segment of the image, assuming that the segment comprises the entire image. Accordingly, even if the 8×8 segment is surrounded by other 8×8 segments, the pixels beyond the boundaries of 8×8 segment in question are treated as beyond the image boundary and any pixel beyond those boundaries are treated as having an intensity of zero (or other boundary condition).

All of the options for filtering and weighting discussed above in connection with step 54 may be employed in step 74 for the embodiment disclosed in FIG. 5 (including the option of not filtering the defect channel) . However, because the segment in this example is 8×8, an 8×8 filter is the maximum sized filter that will be used in this example. The weight function, in this embodiment, takes into account red leakage and clear film effects as discussed above in connection with step 54. The weight for a particular pixel for the weighted average calculations may be determined, for example, using Formula 2.

$$W(x,y)=2(D_{in}(x,y)-R_L R_{in}(x,y)-C_F)+1.4 \tag{2}$$

Limit $0 \leqq W(x,y) \leqq 1$

In Formula 2, x and y represent the coordinates of a particular pixel within an 8×8 segment. $D_{in}$ represents the defect channel received from the scanner in step 68. $R_L$ comprises a constant value representative of average red leakage in either the segment in question or in the entire digital image. $R_{IN}$ represents the red channel of the digital image. $C_F$ is a constant representing the average clear film value for either the segment in question or the entire digital image. The weight function of Formula 2 is constrained such that the weight varies between zero and one. A plot of the weighting function versus the intensity in the defect channel would look similar to the curve illustrated in FIG. 6. Any other weight function could be used without departing from the scope of the invention.

In this example, two different weighted averages are computed for each channel. A 3×3 weighted average is computed. In addition, an 8×8 weighted average is computed. The 8×8 average covers the entire segment, and as a result, a single scalar value may be used to represent the result of this weighted average. The 3×3 weighted average for the red, green, blue, and defect channels may be computed using Formulas 3 through 6.

$$R_{3L}(x,y)=\frac{\sum_{a=-1}^{1}\sum_{b=-1}^{1}W(x+a,y+b)R_{in}(x+a,y+b)}{\sum_{a=-1}^{1}\sum_{b=-1}^{1}W(x+a,y+b)} \quad \text{where} \sum_{a=-1}^{1}\sum_{b=-1}^{1}W(x+a,y+b)\neq 0$$
$$R_{3L}(x,y)=0 \quad \text{where} \sum_{a=-1}^{1}\sum_{b=-1}^{1}W(x+a,y+b)=0 \tag{3}$$

$$G_{3L}(x,y)=\frac{\sum_{a=-1}^{1}\sum_{b=-1}^{1}W(x+a,y+b)G_{in}(x+a,y+b)}{\sum_{a=-1}^{1}\sum_{b=-1}^{1}W(x+a,y+b)} \quad \text{where} \sum_{a=-1}^{1}\sum_{b=-1}^{1}W(x+a,y+b)\neq 0$$
$$G_{3L}(x,y)=0 \quad \text{where} \sum_{a=-1}^{1}\sum_{b=-1}^{1}W(x+a,y+b)=0 \tag{4}$$

$$B_{3L}(x,y)=\frac{\sum_{a=-1}^{1}\sum_{b=-1}^{1}W(x+a,y+b)B_{in}(x+a,y+b)}{\sum_{a=-1}^{1}\sum_{b=-1}^{1}W(x+a,y+b)} \quad \text{where} \sum_{a=-1}^{1}\sum_{b=-1}^{1}W(x+a,y+b)\neq 0$$
$$B_{3L}(x,y)=0 \quad \text{where} \sum_{a=-1}^{1}\sum_{b=-1}^{1}W(x+a,y+b)=0 \tag{5}$$

$$D_{3L}(x,y)=\frac{\sum_{a=-1}^{1}\sum_{b=-1}^{1}W(x+a,y+b)D_{in}(x+a,y+b)}{\sum_{a=-1}^{1}\sum_{b=-1}^{1}W(x+a,y+b)} \quad \text{where} \sum_{a=-1}^{1}\sum_{b=-1}^{1}W(x+a,y+b)\neq 0$$
$$D_{3L}(x,y)=0 \quad \text{where} \sum_{a=-1}^{1}\sum_{b=-1}^{1}W(x+a,y+b)=0 \tag{6}$$

In these Formulas, $R_{in}$, $G_{in}$, $B_{in}$, $D_{in}$, respectively, represent the red, green, blue, and defect channels of the digital image that was scanned in step 68.

The 8×8 weighted average for the red, green, blue, and defect channels may be calculated using Formulas 7 through 10, respectively. As noted, each of these Formulas produces a scalar result.

$$R_{8L}(x,y)=\frac{\sum_{a=0}^{7}\sum_{b=0}^{7}W(a,b)R_{in}(a,b)}{\sum_{a=0}^{7}\sum_{b=0}^{7}W(a,b)} \quad \text{where} \sum_{a=0}^{7}\sum_{b=0}^{7}W(a,b)\neq 0$$
$$R_{8L}(x,y)=0 \quad \text{where} \sum_{a=0}^{7}\sum_{b=0}^{7}W(a,b)=0 \tag{7}$$

$$G_{8L}(x,y)=\frac{\sum_{a=0}^{7}\sum_{b=0}^{7}W(a,b)G_{in}(a,b)}{\sum_{a=0}^{7}\sum_{b=0}^{7}W(a,b)} \quad \text{where} \sum_{a=0}^{7}\sum_{b=0}^{7}W(a,b)\neq 0$$
$$G_{8L}(x,y)=0 \quad \text{where} \sum_{a=0}^{7}\sum_{b=0}^{7}W(a,b)=0 \tag{8}$$

-continued $$B_{8L}(x,y)=\frac{\sum_{a=0}^{7}\sum_{b=0}^{7}W(a,b)B_{in}(a,b)}{\sum_{a=0}^{7}\sum_{b=0}^{7}W(a,b)} \quad \text{where} \sum_{a=0}^{7}\sum_{b=0}^{7}W(a,b)\neq 0$$
$$B_{8L}(x,y)=0 \quad \text{where} \sum_{a=0}^{7}\sum_{b=0}^{7}W(a,b)=0 \tag{9}$$

$$D_{8L}(x,y)=\frac{\sum_{a=0}^{7}\sum_{b=0}^{7}W(a,b)D_{in}(a,b)}{\sum_{a=0}^{7}\sum_{b=0}^{7}W(a,b)} \quad \text{where} \sum_{a=0}^{7}\sum_{b=0}^{7}W(a,b)\neq 0$$
$$D_{8L}(x,y)=0 \quad \text{where} \sum_{a=0}^{7}\sum_{b=0}^{7}W(a,b)=0 \tag{10}$$

$R_{3L}$ represents a weighted low-pass filtered version of the red channel of the digital image having a frequency band between approximately zero and 1/3 $F_m$, where $F_m$ is the maximum spatial frequency possible for the segment of the digital image. $G_{3L}$, $B_{3L}$, and $D_{3L}$ cover a similar frequency band for the green, blue, and defect channels respectively. $R_{8L}$ represents a weighted low-pass filtered version of the red channel of the digital image having a frequency band between approximately zero and 1/8 $F_m$. $G_{8L}$, $B_{8L}$, and $D_{8L}$ represent weighted low-pass filtered versions of the green, blue, and defect channels, respectively in the same frequency band.

In step 76, the segment of the image is adjusted to lessen the effects of defects in the image in response to the weighted averages of each image channel and the defect channel obtained in step 74 and the original image channels and defect channels. Any of the options discussed above in connection with step 56 and steps 60 through 67 may be used in connection such adjustment.

In this example, a version of the original image and original defect channel, with effects of the defect partially suppressed due the weighted averages computed in step 74, is created in three separate frequency bands. For each image channel and the defect channel, a first frequency band is obtained having frequencies between approximately zero and 1/8 $F_m$. A second frequency band extends from approximately 1/8 $F_m$ to 1/3 $F_m$. A third frequency band extends from approximately 1/3 $F_m$ to $F_m$.

The first frequency band may be obtained using Formulas 11 through 14.

$$R_{8B}=R_{8L} \quad (11)$$

$$G_{8B}=G_{8L} \quad (12)$$

$$B_{8B}=B_{8L} \quad (13)$$

$$D_{8B}=D_{8L} \quad (14)$$

Because this frequency band was already calculated in step 74, it can be used without any further computation.

The third frequency may be computed using Formulas 15 through 18. In these Formulas, the weighted low-pass filtered version of each channel in the frequency range of approximately zero to 1/3 $F_m$ is subtracted from the unfiltered image channel to produce the frequency band between approximately 1/3 $F_m$ and $F_m$.

$$R_{1B}(x,y)=R_{in}(x,y)-R_{3L}(x,y) \quad (15)$$

$$G_{1B}(x,y)=G_{in}(x,y)-G_{3L}(x,y) \quad (16)$$

$$B_{1B}(x,y)=B_{in}(x,y)-B_{3L}(x,y) \quad (17)$$

$$D_{1B}(x,y)=D_{in}(x,y)-D_{3L}(x,y) \quad (18)$$

Finally, the second frequency band, the one between approximately 1/8 $F_m$ and 1/3 $F_m$ may be computed using Formulas 19 through 22. In Formulas 19 through 22, the 8×8 weighted filtered version of each image channel is subtracted from the 3×3 weighted filtered version of the original image channel. The process just described for creating a plurality of frequency bands may employ any of the options discussed above in connection with step 60.

$$R_{3B}(x,y)=R_{3L}(x,y)-R_{8L} \quad (19)$$

$$G_{3B}(x,y)=G_{3L}(x,y)-G_{8L} \quad (20)$$

$$B_{3B}(x,y)=B_{3L}(x,y)-B_{8L} \quad (21)$$

$$D_{3B}(x,y)=D_{3L}(x,y)-D_{8L} \quad (22)$$

Next, the red residue may be removed from the defect channel in each frequency band. Again, any of the options described above in connection with step 62 may be used without departing from the scope of the invention. In this embodiment, a bounded subtraction is used for two of the frequency band and a simple subtraction is used for the remaining frequency band. Formula 23 may be used to subtract the red residue in the first frequency band of the defect channel.

$$D'_{8B}=\frac{D_{8B}-R_{8B}D_{K8}R_L}{1-D_{K8}R_L} \quad (23)$$

In Formula 23, the constant, $D_{K8}$, will normally be set to one, but may vary depending upon the scanner in question. This constant represents the amount of the red channel that should be subtracted from the defect relative to the measured average red leakage for the entire segment and/or the entire image.

Formulas 24 through 26 may be used to subtract the red residue from the second frequency band of the defect channel.

$$T1_{D3B}(x,y)=\frac{D_{3B}(x,y)-R_{3B}(x,y)D_{K3H}R_L}{1-D_{K3H}R_L} \quad (24)$$

$$T2_{D3B}(x,y)=\frac{D_{3B}(x,y)-R_{3B}(x,y)D_{K3L}R_L}{1-D_{K3L}R_L} \quad (25)$$

$$D'_{3B}(x,y)=T1_{D3B}(x,y) \text{ where } |T1_{D3B}(x,y)|\leq|T2_{D3B}(x,y)|$$

and $T1_{D3B}(x,y)$ and $T2_{D3B}(x,y)$ have the same sign $$D'_{3B}(x,y)=T2_{D3B}(x,y) \text{ where } |T2_{D3B}(x,y)|<|T1_{D3B}(x,y)| \quad (26)$$

and $T1_{D3B}(x,y)$ and $T2_{D3B}(x,y)$ have the same sign $$D'_{3B}(x,y)=0$$

where $T1_{D3B}(x,y)$ and $T2_{D3B}(x,y)$ have different signs

The bounded subtraction provided for in Formulas 24 through 26 allows for local variance in the red leakage value, as well as for some registration error and/or blurring in the defect channel as compared to the visible channel. Formula 24 multiplies a high value constant, $D_{K3H}$ against the red leakage constant, $R_L$. Formula 25 multiplies a low-value constant, $D_{K3L}$, by the red leakage constant, $R_L$. $D_{K3H}$ and $D_{K3L}$ are the high and low ranges determining how much of the image content in the red channel should be subtracted from the defect channel. These constants may be determined experimentally.

In this embodiment, $D_{K3H}$ is chosen to be 1.3 while $D_{K3L}$ is chosen to be 0.6. These constants will tend to average about one. The average is a function of the resolution of the system for the infrared channel versus the red channel. The spread between these two constants is a function of the accuracy of the scanner that produces the defect channel. If $D_{K3H}$ is chosen too large, then small image patterns may cause large matching defects to be erased, rendering defects uncorrected in middle frequencies when they are next to image detail. If $D_{K3H}$ is chosen too small, then image residue may remain in the defect record, causing middle frequency image detail to be erased. If $D_{K3L}$ is chosen too large, then too much image detail may be removed from the defect causing a negative residue that interferes with the ability to distinguish a defect. If $D_{K3L}$ is chosen too small, then visible detail may not be removed in the presence of defect detail of opposite polarity.

After the results of Formula 24 and 25 are calculated, the revised version of the frequency band is calculated using Formula 26. If the results of Formula 24 and Formula 25 have different signs, then the intensity value is set to zero. If these signs are the same, then the lesser value produced by either Formula 24 or Formula 25 is chosen. Thus, this bounded subtraction tends to drive the revised value closer to zero.

Formulas 27 through 32 may be used to remove red residue in the defect channel for the third frequency band created above.

$$T1_{D1B}(x,y)=\frac{D_{1B}(x,y)-R_{1B}(x,y)D_{K1H}R_L}{1-D_{K1H}R_L} \quad (27)$$

$$T2_{D1B}(x,y)=\frac{D_{1B}(x,y)-R_{1B}(x,y)D_{K1L}R_L}{1-D_{K1L}R_L} \quad (28)$$

$T3_{D1B}(x,y)=T1_{D1B}(x,y)$ where $|T1_{D1B}(x,y)|\leqq|T2_{D1B}(x,y)|$ and $T1_{D1B}$(x,y) and $T2_{D1B}$(x,y) have the same sign $T3_{D1B}(x,y)=T2_{D1B}(x,y)$ where $|T2_{D1B}(x,y)|<|T1_{D1B}(x,y)|$ (29)

and $T2_{D1B}$(x,y) and $T1_{D1B}$(x,y) have the same sign $T3_{D1B}(x,y)=0$ where $T1_{D1B}$(x,y) and $T2_{D1B}$(x,y) have different signs $T4_{D1B}(x,y)=T3_{D1B}(x,y)-D_{K1A}$ (30)

$T5_{D1B}(x,y)=T3_{D1B}(x,y)-D_{K1A}$ (31)

$D'_{1B}(x,y)=T4_{D1B}(x,y)$ where $|T4_{D1B}(x,y)|\leqq|T5_{D1B}(x,y)|$ and $T4_{D1B}$(x,y) and $T5_{D1B}$(x,y) have the same sign $D'_{1B}(x,y)=T5_{D1B}(x,y)$ where $|T5_{D1B}(x,y)|<|T4_{D1B}(x,y)|$ (32)

and $T5_{D1B}$(x,y) and $T4_{D1B}$(x,y) have the same sign $D'_{1B}(x,y)=0$ where $T5_{D1B}$(x,y) and $T4_{D1B}$(x,y) have opposite signs Formulas 27 through 29 are similar to Formulas 24 through 26. For this frequency band, in this example, the high-constant $D_{K1H}$ is chosen to be 1.0 while the low-frequency constant, $D_{K1L}$ is chosen to be 0.3. Similar considerations apply to the choice of these constants, as applied to the choice of $D_{K3H}$ and $D_{K3L}$ above. In this case, the effects of these constants will be in the high frequency band. Here, the average of the two constants is less than one and may be chosen as such to the extent that heightened frequency defects are blurred relative to the high frequency image. The range is also wider to accommodate a greater variance that often occurs at higher frequencies.

The difference between Formulas 27 through 32 and Formulas 23 through 26 involves the addition of Formulas 30 through 31. These Formulas make a minor adjustment in the value computed by Formula 29 to adjust for residual noise in the high-frequency portion of the defect channel. In this embodiment, constant $D_{K1A}$ has a value of 0.01. If the residual noise constant, $D_{K1A}$ is set too high, then detail in small defects in the image may not be removed. If the value is set too low, then too little residual electronic noise will be removed from this frequency band of the defect channel and such noise in the defect channel may appear in the visible channel(s) as a negative of this noise, causing the electronic noise in the defect channel to contaminate the processed visible image.

Next, the defect is removed from the visible image frequency band by frequency band. Similar bounded subtractions are performed as were performed when the red residue was removed from the defect channel above. In this case, the constant for the first frequency band, $R_{K8}$, is set to one, but could be adjusted. For this frequency band, a direct subtraction is used, rather than a bounded subtraction. Blurring effects tend not to affect this frequency band or affect it insignificantly, but a bounded subtraction could be employed if desired. The constants $R_{K3H}$ and $R_{K3L}$ are set to 1.5 and 0.5 respectively. The constants $R_{K1H}$ and $R_{K1L}$ are set to 1.7 and 0.5, respectively. These values are also chosen for the corresponding constants for the green and blue channels. These constants establish the bounds within which correction is made. Again, one selects whichever number between the bounds drives the corrected result closet to zero. The upper and lower bounds will normally average about one, except that one may set the lower bound a bit lower without damaging the image. Finally, the defects in the original image may be suppressed even further by multiplying the pixels resulting from a bounded subtraction of the defect channel from the image channel by the weight for a particular pixel calculated using Formula 2.

The defects may be removed from each frequency band of the visible image channels, using Formulas 33 through 59. Formulas 33 through 35 may be used to remove defect information from the first frequency band. Formulas 36 through 47 may be used to remove the defect from the middle frequency band of each channel. Formulas 48 through 59 may be used to remove the defect from the third frequency band of each channel.

$R'_{8B}=R_{8B}-D'_{8B}R_{K8}$ (33)

$G'_{8B}=G_{8B}-D'_{8B}G_{K8}$ (34)

$B'_{8B}=B_{8B}-D'_{8B}B_{K8}$ (35)

$T1_{R3B}(x,y)=R_{3B}(x,y)-D'_{3B}(x,y)R_{K3H}$ (36)

$T2_{R3B}(x,y)=R_{3B}(x,y)-D'_{3B}(x,y)R_{K3H}$ (37)

$T3_{R3B}(x,y)=T1_{R3B}(x,y)$ where $|T1_{R3B}(x,y)|\leqq|T2_{R3B}(x,y)|$ and $T1_{R3B}$(x,y) and $T2_{R3B}$(x,y) have the same sign $T3_{R3B}(x,y)=T2_{R3B}(x,y)$ where $|T2_{R3B}(x,y)|<|T1_{R3B}(x,y)|$ (38)

and $T2_{R3B}$(x,y) and $T1_{R3B}$(x,y) have the same sign $T3_{R3B}(x,y)=0$ where $T2_{R3B}$(x,y) and $T1_{R3B}$(x,y) have opposite signs $R'_{3B}(x,y)=T3_{R3B}(x,y)W(x,y)$ (39)

$T1_{G3B}(x,y)=G_{3B}(x,y)-D'_{3B}(x,y)G_{K3H}$ (40)

$T2_{G3B}(x,y)=G_{3B}(x,y)-D'_{3B}(x,y)G_{K3L}$ (41)

$T3_{G3B}(x,y)=T1_{G3B}(x,y)$ where $|T1_{G3B}(x,y)|\leqq|T2_{G3B}(x,y)|$ and $T1_{G3B}$(x,y) and $T2_{G3B}$(x,y) have the same sign $T3_{G3B}(x,y)=T2_{G3B}(x,y)$ where $|T2_{G3B}(x,y)|<|T1_{G3B}(x,y)|$ (42)

and $T2_{G3B}$(x,y) and $T1_{G3B}$(x,y) have the same sign $T3_{G3B}(x,y)=0$ where $T2_{G3B}$(x,y) and $T1_{G3B}$(x,y) have opposite signs $G'_{3B}(x,y)=T3_{G3B}(x,y)W(x,y)$ (43)

$T1_{B3B}(x,y)=B_{3B}(x,y)-D'_{3B}(x,y)B_{K3H}$ (44)

$T2_{B3B}(x,y)=B_{3B}(x,y)-D'_{3B}(x,y)B_{K3L}$ (45)

$T3_{B3B}(x,y)=T1_{B3B}(x,y)$ where $|T1_{B3B}(x,y)|\leqq|T2_{B3B}(x,y)|$ and $T1_{B3B}$(x,y) and $T2_{B3B}$(x,y) have the same sign $$T3_{B3B}(x,y)=T2_{B3B}(x,y) \text{ where } |T2_{B3B}(x,y)|<|T1_{B3B}(x,y)| \quad (46)$$

and $T2_{B3B}$(x,y) and $T1_{B3B}$(x,y) have the same sign $$T3_{B3B}(x,y)=0$$

where $T2_{B3B}$(x,y) and $T1_{B3B}$(x,y) have opposite signs $$B'_{3B}(x,y)=T3_{B3B}(x,y)W(x,y) \quad (47)$$

$$T1_{R1B}(x,y)=R_{1B}(x,y)-D'_{1B}(x,y)R_{K1H} \quad (48)$$

$$T2_{R1B}(x,y)=R_{1B}(x,y)-D'_{1B}(x,y)R_{K1L} \quad (49)$$

$$T3_{R1B}(x,y)=T1_{R1B}(x,y) \text{ where } |T1_{R1B}(x,y)|\leqq|T2_{R1B}(x,y)|$$

and $T1_{R1B}$(x,y) and $T2_{R1B}$(x,y) have the same sign $$T3_{R1B}(x,y)=T2_{R1B}(x,y) \text{ where } |T2_{R1B}(x,y)|<|T1_{G3B}(x,y)| \quad (50)$$

and $T2_{R1B}$(x,y) and $T1_{R1B}$(x,y) have the same sign $$T3_{R1B}(x,y)=0$$

where $T2_{R1B}$(x,y) and $T1_{R1B}$(x,y) have opposite signs $$R'_{1B}(x,y)=T3_{R1B}(x,y)W(x,y) \quad (51)$$

$$T1_{G1B}(x,y)=G_{1B}(x,y)-D'_{1B}(x,y)G_{K1H} \quad (52)$$

$$T2_{G1B}(x,y)=G_{1B}(x,y)-D'_{1B}(x,y)G_{K1L} \quad (53)$$

$$T3_{G1B}(x,y)=T1_{G1B}(x,y) \text{ where } |T1_{G1B}(x,y)|\leqq|T2_{G1B}(x,y)|$$

and $T1_{G1B}$(x,y) and $T2_{G1B}$(x,y) have the same sign $$T3_{G1B}(x,y)=T2_{G1B}(x,y) \text{ where } |T2_{G1B}(x,y)|<|T1_{B3B}(x,y)| \quad (54)$$

and $T2_{G1B}$(x,y) and $T1_{G1B}$(x,y) have the same sign $$T3_{G1B}(x,y)=0$$

where $T2_{G1B}$(x,y) and $T1_{G1B}$(x,y) have opposite signs $$G'_{1B}=T3_{G1B}(x,y)W(x,y) \quad (55)$$

$$T1_{B1B}(x,y)=B_{1B}(x,y)-D'_{1B}(x,y)B_{K1H} \quad (56)$$

$$T2_{B1B}(x,y)=B_{1B}(x,y)-D'_{1B}(x,y)B_{K1L} \quad (57)$$

$$T3_{B1B}(x,y)=T1_{B1B}(x,y) \text{ where } |T1_{B1B}(x,y)|\leqq|T2_{B1B}(x,y)|$$

and $T1_{B1B}$(x,y) and $T2_{B1B}$(x,y) have the same sign $$T3_{B1B}(x,y)=T2_{B1B}(x,y) \text{ where } |T2_{B1B}(x,y)|<|T1_{B1B}(x,y)| \quad (58)$$

and $T2_{B1B}$(x,y) and $T1_{B1B}$(x,y) have the same sign $$T3_{B1B}(x,y)=0$$

where $T2_{B1B}$(x,y) and $T1_{B1B}$(x,y) have opposite signs $$B'_{1B}=T3_{B1B}(x,y)W(x,y) \quad (59)$$

To obtain an enhanced image with the defect removed, the frequency bands may be recombined for each channel using Formulas 60 through 62.

$$R_{out}(x,y)=R'_{1B}(x,y)+R'_{3B}(x,y)+R'_{8B}(x,y) \quad (60)$$

$$G_{out}(x,y)=G'_{1B}(x,y)+G'_{3B}(x,y)+G'_{8B}(x,y) \quad (61)$$

$$B_{out}(x,y)=B'_{1B}(x,y)+B'_{3B}(x,y)+B'_{8B}(x,y) \quad (62)$$

These enhanced images may be converted back to the original image space using an appropriate inverse logarithmic function. Again, all of the options discussed above in connection with step 67 are applicable to this embodiment as well.

In step 78, it is determined whether there are any more segments of the digital image to process. If so, then steps 74 and 76 are repeated for each remaining segment of the digital image. If no more segments are to be processed, then the method continues in step 80.

In step 80, it is determined if there are more overlaps to perform. If not, then the procedure terminates in step 84. If so, then each channel of the enhanced digital image obtained by using steps 74 and 76 for each segment is divided into segments spatially different from the earlier segments. Steps 74 and 76 are then repeated for each of these segments. This aspect of this embodiment may compensate for results that may be obtained for pixels near the boundary of segments that were used when the image was first divided into segments in step 72. By performing defect removal a second time, the defect may be further suppressed. In this example, a second overlap is performed using 8×8 segments comprising a 2×2 corner of four adjoining segments that touch one another at a common point. These 8×8 segments are thus made up of one-fourth of each of four adjoining segments. Any of the options described above with respect to step 72 may be used in step 82 in performing division of the enhanced image into different segments. Different shapes can be used and different size segments can be used without departing from the scope of the invention.

Figure 7:
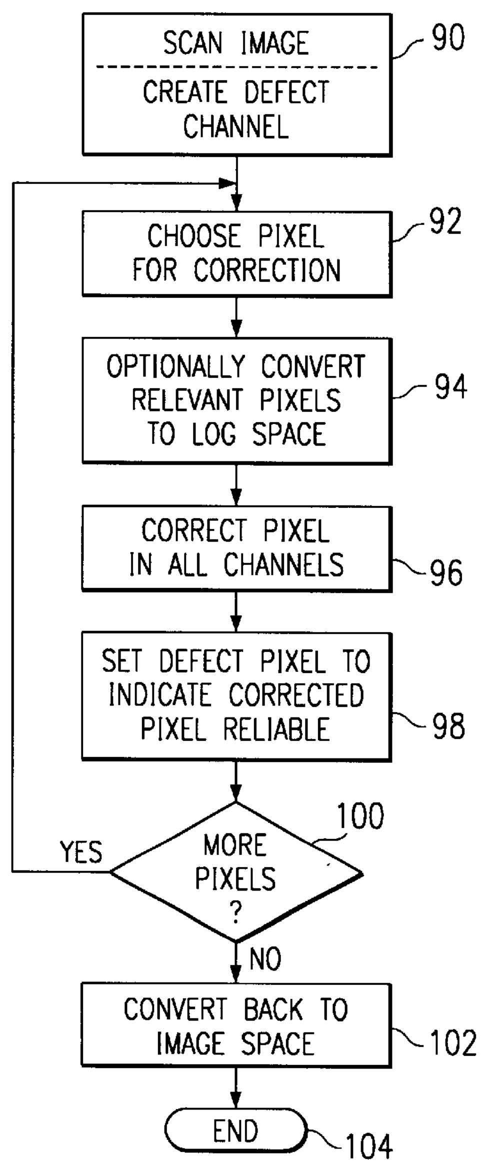
FIG. 7 illustrates a flow chart describing a method of altering defects in a digital image using in-place correction in accordance with the present invention.

FIG. 7 illustrates a flow chart describing a method of altering defects in a digital image using in-place correction in accordance with the invention. In some implementations, defect correction may be performed for a color digital image by using the three channels of the color digital image and the defect channel to produce a three-channel corrected output image. Because many forms of defect correction use surrounding pixel values in determining a corrected pixel value, all of the original image information and the defect channel may be used to form the output image as a separate item in RAM 14 or disk drives 22 of general purpose computer 10 or on storage medium 38 of scanner 34. In other words, the correction process may utilize storage sufficient to store seven channels of information—the three channels of the input digital image, the defect channel, and the three channels of the output digital image. With a monochromatic image, the single channel of the input digital image, the defect channel, and the single channel of the output digital image may be stored. Similar numbers of channels may be stored for other types of images such as satellite images or medical images.

In some scanners or image processing systems, the storage of an output digital image separate from the input digital image may be a significant factor in the cost of the system, due to the amount of memory used. In other systems, memory cost may not be a significant factor.

FIG. 7 illustrates a method for correcting the input digital image which performs correction in place without creating a separate output digital image. Instead, the channel or channels of the input digital image are corrected in place. While the correction is in process, the channel or channels of the input digital image will have some pixels that have been corrected and other pixels that have not been corrected. The invention takes into account that correcting a pixel changes the information provided by that pixel and that such a change may affect correction of adjacent pixels.

Although the invention described in FIG. 7 may be used in connection with the invention or inventions described in FIGS. 1–6, it may be used with other defect correction algorithms without departing from the scope of the invention illustrated and described in connection with FIG. 7.

In step 90, a tangible image is scanned to create a digital image and a defect channel. As noted above, the image can be an image on photographic film or any other type of tangible image such as a photographic print or document. The image may be scanned in the case of photographic film, using a film scanner, or can be scanned in the case of other tangible media using a flatbed or drum scanner. The invention may also be used with an existing digital image and defect channel related to the digital image that have been previously obtained without departing from the scope of the invention. Accordingly, step 90 is optional.

In step 92, a pixel is chosen for correction. Some defect correction algorithms may apply the algorithm to each pixel in the image. In such a case, step 92 may simply choose the first pixel in the image during the first pass through the process described in FIG. 7. In other defect correction algorithms, a pixel may only have a defect correction algorithm applied if information from the defect channel indicates a high probability that the pixel is defective. In such an algorithm, the pixel chosen in step 92 may be the first pixel encountered in the image satisfying that criteria. Any method of choosing a pixel for correction may be used for step 92 without departing from the scope of the invention.

In step 94, the relevant pixels used for the correction may be converted to log space. As discussed above, conversion to log space may facilitate better calculation for various image defect correction algorithms. However, a conversion to log space need not be performed if not desired. In addition, all of the pixels in each channel of the digital image and the defect channel may be converted to log space before the correction process beings. Alternatively, only those pixels needed for a particular correction calculation may be converted to log space on an as-needed basis. Either option can be used without departing from the scope of the invention. One option for converting pixels of the image channel, or channels, and defect channel to log space is Formula 1 described above. Other formulas for conversion to log space may be used without departing from the scope of the invention.

In step 96, the pixel is corrected in all channels of the digital image using some type of correction algorithm such as, for example, the correction algorithms described above. Then, in step 98, the defect pixel spatially corresponding to the corrected pixel is set to a value indicating that the corrected pixel is now reliable. For example, the intensity value of the defect pixel may be set to a predetermined value comprising a threshold over which the correction algorithm used in step 96 determines that the pixel is reliable. In film scanners, the defect channel may be adjusted to take into account clear film levels and red leakage as described above. If no defect is present, then the intensity of the defect channel should comprise a level corresponding to the level that would result if the light source used to create the defect channel was sent through clear film of the type being scanned plus the red leakage. Thus, the defect channel can be adjusted to reflect the clear film level, the red leakage, or both for a particular pixel. Such a defect level will indicate to the defect correction algorithm applied in step 96 that the corrected pixel is reliable in subsequent calculations involving the pixel in question. Formula 63 provides one example of a formula that may be used to calculate a new defect value taking into account both clear film and red leakage.

$$D'(x,y)=C_F+R(x,y)R_L \quad (63)$$

In Formula 63, $C_F$ is the clear film intensity value, $R_L$ comprises a red leakage measurement while R comprises the intensity of the pixel in question in the red channel. Other formulas may be used without departing from the scope of the invention.

During the correction of pixels adjacent to a pixel that has been corrected in this manner, the defect correction algorithm will interpret the corrected pixel as reliable. If step 98 were omitted and the defect channel not altered after alteration of the corresponding pixels in the channels of the digital image, then the correction algorithm might erroneously conclude that an already corrected pixel was defective, and, as a result, potentially degrade the performance of the correction algorithm. The invention allows in-place correction without this difficulty.

In step 100, it is determined whether there are any more pixels remaining in the image that may be corrected. If so, then the procedure returns to step 92. If not, then the procedure continues to step 102. In step 102, the pixels of the image and defect channel are converted back to image space from log space if they were converted to log space in step 94. The procedure then terminates in step 104. If a correction algorithm is chosen where only those pixels involved in a particular correction calculation are converted to log space as needed, then the corrected pixel and corrected defect pixel should be converted back to image space after step 98 and before step 100.

Although the inventions described herein involve calculations in the spatial domain, analogous calculations in the frequency domain could equivalently be used without departing from the scope of the invention.

Although the present invention has been described in detail, it should be understood that various changes, substitutions and alterations can be made hereto without departing from the sphere and scope of the invention as defined by the appended claims.

To aid the Patent Office, and any readers of any patent issued on this application in interpreting the claims appended hereto, applicants wish to note that they do not intend any of the appended claims to invoke ¶ 6 of 35 U.S.C. §112 as it exists on the date of filing hereof unless "means for" or "step for" are used in the particular claim.

What is claimed is:

1. A method for correcting a digital image representative of a tangible image, comprising:

calculating using electronic circuitry a first corrected intensity value for a first pixel of a first channel of the digital image in response to the intensity of a first defect pixel in a defect channel associated with the digital image, the first pixel having a first original intensity value;

replacing the first original intensity value with the first corrected intensity value;

replacing the intensity of the first defect pixel with an intensity value signifying that the first pixel is reliable; and calculating using electronic circuitry a second corrected intensity value for a second pixel of the first channel of the digital image in response to the intensity of the first pixel after replacement and the intensity of the first defect pixel after replacement.

2. The method of claim 1, wherein the intensity value signifying that the first pixel is reliable is responsive to a clear film intensity value, the clear film intensity value comprising the intensity of a pixel of the defect channel that results when light from a light source used to create the defect channel is passed through clear film of the type on which the tangible image is stored.

3. The method of claim 1, wherein the intensity value signifying that the first pixel is reliable comprises a predetermined value.

4. The method of claim 1, wherein the digital image comprises a red channel, a blue channel, and a green channel; and wherein the intensity value signifying that the first pixel is reliable is responsive to a red leakage value, the red leakage value comprising a measure of the amount of information from the red channel present in the defect channel.

5. The method of claim 4, wherein the intensity value signifying that the first pixel is reliable is further responsive to a clear film intensity value, the clear film intensity value comprising the intensity of a pixel of the defect channel that results when light from a light source used to create the defect channel is passed through clear film of the type on which the tangible image is stored.

6. The method of claim 1, wherein the digital image comprises a red channel, a blue channel, and a green channel.

7. The method of claim 6, further comprising:

calculating using electronic circuitry a third corrected intensity value for a first pixel of the red channel of the digital image in response to the intensity of the first defect pixel, the first pixel of the red channel having a third original intensity value;

calculating using electronic circuitry a fourth corrected intensity value for a first pixel of the green channel of the digital image in response to the intensity of a first defect pixel, the first pixel of the green channel having a fourth original intensity value;

replacing the third original intensity value with the third corrected intensity value;

replacing the fourth original intensity value with the fourth corrected intensity value;

wherein the first channel comprises the blue channel of the digital image; and wherein the replacement of the third original intensity value, fourth original intensity value, and first original intensity value occur before the replacement of the intensity of the first defect pixel.

8. The method of claim 7, wherein the intensity value signifying that the first pixel is reliable is responsive to a red leakage value, the red leakage value comprising a measure of the amount of information from the red channel present in the defect channel.

9. The method of claim 8, wherein the intensity value signifying that the first pixel is reliable is further responsive to a clear film intensity value, the clear film intensity value comprising the intensity of a pixel of the defect channel that results when light from a light source used to create the defect channel is passed through clear film of the type on which the tangible image is stored.

10. A digital image scanning system, comprising:

scanning hardware operable to scan an image and convert the image into a digital image having at least one channel and to produce a defect channel responsive to defects in the image; and computer software associated with the scanning hardware and operable to calculate using electronic circuitry a first corrected intensity value for a first pixel of a first channel of the digital image in response to the intensity of a first defect pixel in a defect channel associated with the digital image, the first pixel having a first original intensity value, replace the first original intensity value with the first corrected intensity value, replace the intensity of the first defect pixel with an intensity value signifying that the first pixel is reliable, calculate using electronic circuitry a second corrected intensity value for a second pixel of the first channel of the digital image in response to the intensity of the first pixel after replacement and the intensity of the first defect pixel after replacement.

11. The digital image scanning system of claim 10, wherein the intensity value signifying that the first pixel is reliable is responsive to a clear film intensity value, the clear film intensity value comprising the intensity of a pixel of the defect channel that results when light from a light source used to create the defect channel is passed through clear film of the type on which the tangible image is stored.

12. The digital image scanning system of claim 10, wherein the intensity value signifying that the first pixel is reliable comprises a predetermined value.

13. The digital image scanning system of claim 10, wherein the digital image comprises a red channel, a blue channel, and a green channel; and wherein the intensity value signifying that the first pixel is reliable is responsive to a red leakage value, the red leakage value comprising a measure of the amount of information from the red channel present in the defect channel.

14. The digital image scanning system of claim 13, wherein the intensity value signifying that the first pixel is reliable is further responsive to a clear film intensity value, the clear film intensity value comprising the intensity of a pixel of the defect channel that results when light from a light source used to create the defect channel is passed through clear film of the type on which the tangible image is stored.

15. The digital image scanning system of claim 10, wherein the digital image comprises a red channel, a blue channel, and a green channel.

16. The digital image scanning system of claim 15, wherein the computer software is further operable to:

calculate using electronic circuitry a third corrected intensity value for a first pixel of the red channel of the digital image in response to the intensity of the first defect pixel, the first pixel of the red channel having a third original intensity value;

calculate using electronic circuitry a fourth corrected intensity value for a first pixel of the green channel of the digital image in response to the intensity of a first defect pixel, the first pixel of the green channel having a fourth original intensity value;

replace the third original intensity value with the third corrected intensity value;

replace the fourth original intensity value with the fourth corrected intensity value;

wherein the first channel comprises the blue channel of the digital image; and wherein the replacement of the third original intensity value, fourth original intensity value, and first original intensity value occur before the replacement of the intensity of the first defect pixel.

17. A digital image processing system, comprising:

a computer readable storage medium;

computer software stored on the computer readable storage medium and operable to calculate using electronic circuitry a first corrected intensity value for a first pixel of a first channel of the digital image in response to the intensity of a first defect pixel in a defect channel associated with the digital image, the first pixel having a first original intensity value, replace the first original intensity value with the first corrected intensity value, replace the intensity of the first defect pixel with an intensity value signifying that the first pixel is reliable, calculate using electronic circuitry a second corrected intensity value for a second pixel of the first channel of the digital image in response to the intensity of the first pixel after replacement and the intensity of the first defect pixel after replacement.

18. The digital image processing system of claim 17, wherein the intensity value signifying that the first pixel is reliable is responsive to a clear film intensity value, the clear film intensity value comprising the intensity of a pixel of the defect channel that results when light from a light source used to create the defect channel is passed through clear film of the type on which the tangible image is stored.

19. The digital image processing system of claim 17, wherein the intensity value signifying that the first pixel is reliable comprises a predetermined value.

20. The digital image processing system of claim 17, wherein the digital image comprises a red channel, a blue channel, and a green channel; and wherein the intensity value signifying that the first pixel is reliable is responsive to a red leakage value, the red leakage value comprising a measure of the amount of information from the red channel present in the defect channel.

21. The digital image processing system of claim 20, wherein the intensity value signifying that the first pixel is reliable is further responsive to a clear film intensity value, the clear film intensity value comprising the intensity of a pixel of the defect channel that results when light from a light source used to create the defect channel is passed through clear film of the type on which the tangible image is stored.

22. The digital image processing system of claim 17, wherein the digital image comprises a red channel, a blue channel, and a green channel.

23. The digital image processing system of claim 22, wherein the computer software is further operable to:

calculate using electronic circuitry a third corrected intensity value for a first pixel of the red channel of the digital image in response to the intensity of the first defect pixel, the first pixel of the red channel having a third original intensity value;

calculate using electronic circuitry a fourth corrected intensity value for a first pixel of the green channel of the digital image in response to the intensity of a first defect pixel, the first pixel of the green channel having a fourth original intensity value;

replace the third original intensity value with the third corrected intensity value;

replace the fourth original intensity value with the fourth corrected intensity value;

wherein the first channel comprises the blue channel of the digital image; and wherein the replacement of the third original intensity value, fourth original intensity value, and first original intensity value occur before the replacement of the intensity of the first defect pixel.

24. The digital image processing system of claim 23, wherein the intensity value signifying that the first pixel is reliable is responsive to a red leakage value, the red leakage value comprising a measure of the amount of information from the red channel present in the defect channel.

25. The digital image processing system of claim 24, wherein the intensity value signifying that the first pixel is reliable is further responsive to a clear film intensity value, the clear film intensity value comprising the intensity of a pixel of the defect channel that results when light from a light source used to create the defect channel is passed through clear film of the type on which the tangible image is stored.

26. An altered digital image derived from a digital image having at least one channel, comprising:

a computer readable storage medium;

an altered digital image stored on the computer readable storage medium wherein the altered digital image was created by calculating using electronic circuitry a first corrected intensity value for a first pixel of a first channel of the digital image in response to the intensity of a first defect pixel in a defect channel associated with the digital image, the first pixel having a first original intensity value;

replacing the first original intensity value with the first corrected intensity value;

replacing the intensity of the first defect pixel with an intensity value signifying that the first pixel is reliable; and calculating using electronic circuitry a second corrected intensity value for a second pixel of the first channel of the digital image in response to the intensity of the first pixel after replacement and the intensity of the first defect pixel after replacement.

* * * * *